(12) United States Patent
Sharifi et al.

(10) Patent No.: US 8,699,862 B1
(45) Date of Patent: Apr. 15, 2014

(54) SYNCHRONIZED CONTENT PLAYBACK RELATED TO CONTENT RECOGNITION

(71) Applicant: Google Inc., Mountain View, CA (US)

(72) Inventors: Matthew Sharifi, Zurich (CH); Sanjeev Dhanda, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/760,238

(22) Filed: Feb. 6, 2013

(51) Int. Cl.
*H04N 5/928* (2006.01)

(52) U.S. Cl.
USPC .......................................................... 386/338

(58) Field of Classification Search
USPC ................................................. 386/200, 338
See application file for complete search history.

(56) References Cited

U.S. PATENT DOCUMENTS

| 8,358,376 B2 * | 1/2013 | Oostveen et al. ............. 348/515 |
| 2009/0228544 A1 * | 9/2009 | Demers et al. ................ 709/201 |

FOREIGN PATENT DOCUMENTS

WO     WO 02/27600    *   4/2002

OTHER PUBLICATIONS

B Yanja Obs, How Shazam Works to Identify (Nearly) Every Song You Throw At It, gizmodo.com, Sep. 24, 2010, pp. 1-5.
Avery Li-Chun Wang, An Industrial-Strength Audio Search Algorithm, Shazam Entertainment, Ltd., 7 pages, Palo Alto, CA.
Shumeet Baluja, Michele Covell, Content Fingerprinting Using Wavelets, Google, Inc., 10 pages, Mountain View, CA.
Soundhound, play.google.com/store/apps., 3 pages.

* cited by examiner

*Primary Examiner* — Huy T Nguyen
(74) *Attorney, Agent, or Firm* — Martine Penilla Group, LLP

(57) ABSTRACT

Systems, methods, routines and/or techniques for synchronized content playback related to content recognition are described. A software program may cause a video to play synchronously with a song, for example, a song that is playing in an ambient environment such as a café or bar. In some embodiments, a client device may sense a song and the client device may communicate audio data related to the song to a remote server, and the remote server may identify a song that is related to the audio data. The remote server may also identify one or more videos (e.g., in a video database) that relate to the song. The remote server may communicate one or more of the videos (e.g., a link/URL) back to the client device such that the client device can play one of the videos synchronously with the song, even if playback of the video is delayed.

13 Claims, 7 Drawing Sheets

SYNCHRONIZED CONTENT PLAYBACK RELATED TO CONTENT RECOGNITION

FIELD

The present disclosure relates to content recognition, and more particularly to one or more systems, methods, routines and/or techniques for synchronized content playback related to content recognition.

BACKGROUND

Music or audio recognition software has become increasingly popular in recent years. Such software may be used to recognize and identify a song that is playing in an ambient environment and sensed by a microphone, for example, a microphone connected to a computer running the recognition software.

Further limitations and disadvantages of conventional and traditional approaches will become apparent to one of skill in the art, through comparison of such systems with some aspects of the present disclosure as set forth in the remainder of the present application and with reference to the drawings.

SUMMARY

Systems, methods, routines and/or techniques for synchronized content playback related to content recognition are described. A software program may cause a video to play synchronously with a song, for example, a song that is playing in an ambient environment such as a café or bar. In some embodiments, a client device may sense a song and the client device may communicate audio data related to the song to a remote server, and the remote server may identify a song that is related to the audio data. The remote server may also identify one or more videos (e.g., in a video database) that relate to the song. The remote server may communicate one or more of the videos (e.g., a link/URL) back to the client device such that the client device can play one of the videos synchronously with the song, even if playback of the video is delayed.

These and other advantages, aspects and novel features of the present disclosure, as well as details of an illustrated embodiment thereof, will be more fully understood from the following description and drawings. It is to be understood that the foregoing general descriptions are examples and explanatory only and are not restrictive of the disclosure as claimed.

BRIEF DESCRIPTION OF THE DRAWINGS

Several features and advantages are described in the following disclosure, in which several embodiments are explained, using the following drawings as examples.

DETAILED DESCRIPTION

Figure 1:
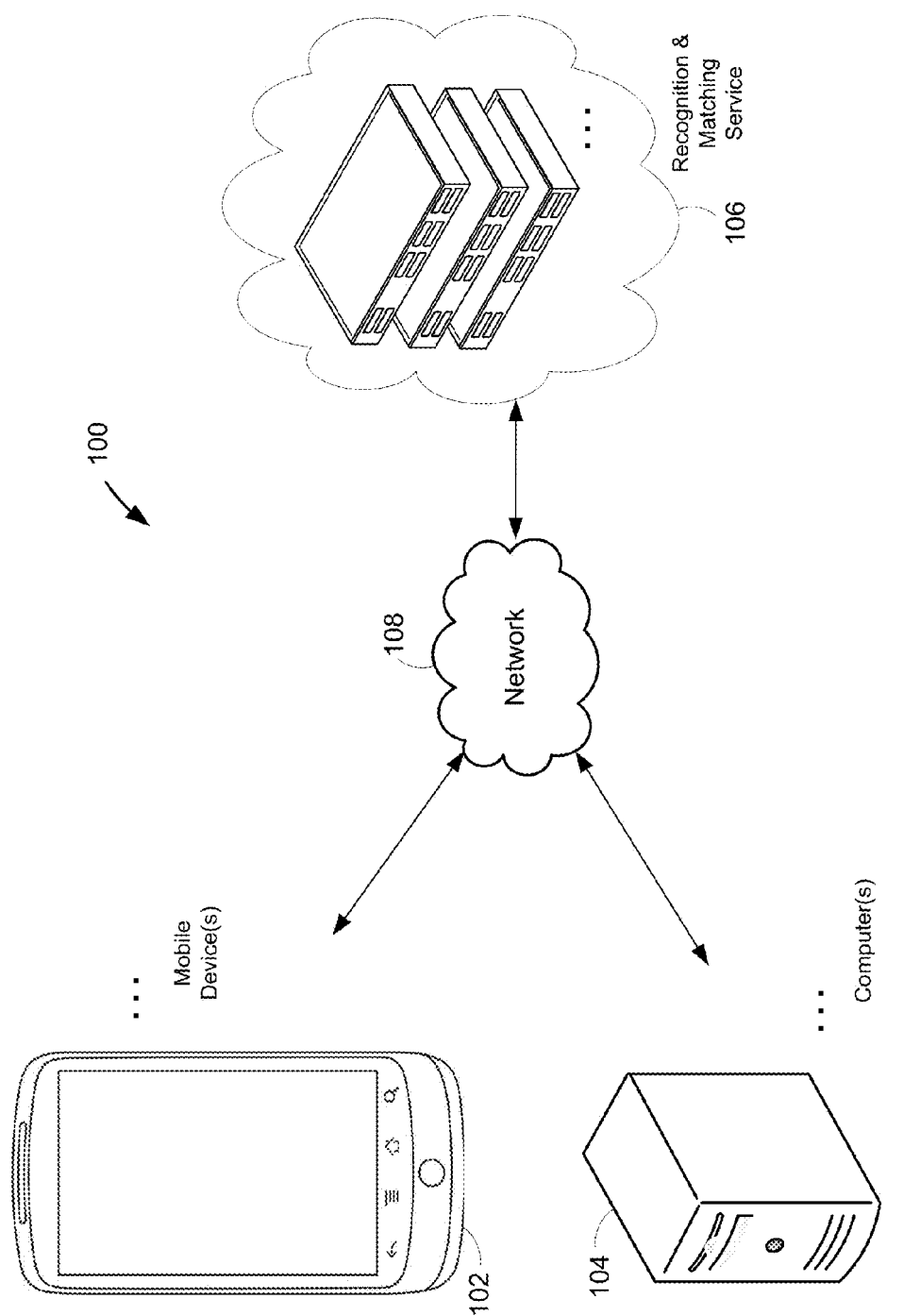
FIG. 1 depicts a block diagram showing example components, connections and interactions of a network setup 100, where one or more embodiments of the present disclosure may be useful in such a network setup.

Various mobile devices may run and/or use music and/or audio recognition software, for example, in the form of a mobile application and/or widget. Such an application and/or widget may allow a user of the mobile device to identify a song they hear in an ambient environment, for example, in a café, in a bar or on the radio. For example, when a user hears a song, the user may activate an audio recognition application and/or widget, and a microphone integrated in the associated mobile device may sense the ambient song and related circuitry and/or software may communicate audio data related to the song to the application and/or widget. The application and/or widget may communicate the audio data to a remote server, and the remote server may execute one or more algorithms or routines to identify a song that is related to the audio data. The remote server may then communicate information about the song back to the mobile device, for example, such that the user can see information about the song that is playing. For example, the mobile device (e.g., via the application and/or widget) may display various pieces of information about the song, such as metadata (e.g., song name, artist, etc.) related to the song. As another example, the application and/or widget may display/provide a link or option that allows the user to purchase a digital version of the song.

The present disclosure describes one or more systems, methods, routines and/or techniques for synchronized content playback related to content recognition. The present disclosure may describe one or more embodiments that include a software program (e.g., a mobile application and/or widget run on a mobile device) that causes a video to play synchronously with a song that is playing in an ambient environment, for example, in a café, in a bar or on the radio. In some embodiments, the software program may run on a mobile device and the video may play on the same mobile device. In some embodiments, a microphone integrated in the associated mobile device may sense the song and related circuitry and/or software may communicate audio data related to the song to the application and/or widget. The application and/or widget may communicate the audio data to a remote server, and the remote server may execute one or more algorithms or routines to identify a song that is related to the audio data. The remote server may also identify one or more videos (e.g., in a video database) that relate to the song. The remote server may then communicate information about one or more of the videos back to the mobile device, for example, such that the mobile device receives information that may be used to play the video synchronously with the song once playback of the video is initiated. Playback of the video may be delayed, and, regardless of whether playback is delayed, the video will be synchronized (with a high accuracy/fineness) with the ambient song.

It should be understood that the embodiment(s) that describe video being synchronized with ambient audio (relate to audio recognition) is just one example embodiment. Various other types of content synchronization (related to various types of content recognition generally) are contemplated by this disclosure. For example, video may be synchronized with video (related to video and/or audio recognition). As a specific example, if a user is watching a live video stream of an event (e.g., the Olympics), various embodiments may use systems, methods, routines and/or techniques similar to those described herein to recognize the identity of the live video that the user is watching. Then, the system could provide content that is similar to the live video and could synchronize the content with the live video. Content could be, for example, live data or statistics (e.g., athlete stats or race times), relevant news, or other video content (e.g., an alternate view of the same live event, or a relevant stored video). As another example, a similar implementation could recognize a recorded video that a user is watching and could provide synchronized content, for example, relevant live or stored video content, or statistics, etc. Therefore, even though the following description, in order to clearly describe this disclosure, may focus on the detection of audio/music and the synchronization of video to that audio/music, it should be understood that various other types of content synchronization (related to various types of content recognition generally) may be implemented by following similar principals to those discussed herein.

FIG. 1 depicts a block diagram showing example components, connections and interactions of a network setup 100, where one or more embodiments of the present disclosure may be useful in such a network setup. It should be understood that the network setup 100 may include additional or fewer components, connections and interactions than are shown in FIG. 1. FIG. 1 focuses on a portion of what may be a much larger network of components, connections and interactions. Network setup 100 may include one or more client devices, for example, one or more mobile devices (e.g., mobile device 102) and/or one or more computers (e.g., personal computer 104). Network setup 100 may include other types of client device, as explained in more detail below. Network setup 100 may include a recognition and matching service 106, where the recognition and matching service may include various computers, servers, routers, switches, connections and other circuitry, devices and the like. Network setup 100 may include a network, for example, network 108. Various client devices (e.g., client devices 102, 104) may be in communication with a verification service 106 via a network 108. Network 108 may be a medium used to provide communication links between various devices, such as data processing systems, computers, servers, mobile devices and perhaps other devices. Network 108 may include connections such as wireless or wired communication links. In some examples, network 108 may represent a worldwide collection of networks and gateways that use the Transmission Control Protocol Internet Protocol (TCP IP) suite of protocols to communicate with one another. In some examples, network 108 may include or be part of an intranet, a local area network (LAN) or a wide area network (WAN). In some examples, network 108 may be part of the internet.

Network setup 100 may include one or more client devices, for example, one or more mobile devices (e.g., mobile device 102) and/or one or more computers (e.g., personal computer 104 such as a desktop or laptop). The mobile device 102 of FIG. 1 may be depicted as a smartphone, but the systems, methods, routines and/or techniques of the present disclosure may work with other mobile devices (e.g., cell phones, tablets, smart watches, PDA's, laptop computers, etc.) or other computers or data processing systems in general. Network setup 100 may include other client devices that have data processing capabilities, for example, smart TVs, smart set-top boxes, etc. Various descriptions herein may reference hardware, software, applications and the like of mobile devices; however, it should be understood that the descriptions may apply to other devices and/or other computers, for example, any device that may download, install and/or run an application and/or software program. Client devices 102, 104 may communicate with various servers (not shown), for example, application servers, to download applications, application packages, software programs, executables and/or the like. Client device 102, 104 may communicate with one or more recognition and matching services (e.g., recognition and matching service 106), for example, to communicate information related to music and/or audio detected by the client device. Client devices 102, 104 may receive (from the one or more recognition and matching services) information related to music and/or audio, for example, information that the client devices may use to play a video related to the music and/or audio.

Network setup 100 may include one or more recognition and matching services, for example, recognition and matching service 106. A recognition and matching service 106 may include various computers, servers, data stores, routers, switches, connections and other circuitry, devices, modules and the like. These various components of a recognition and matching service 106 may communicate and operate together to provide a unified service that various client devices can access. For example, recognition and matching service may be accessible to a client at one or more known network addresses, for example, IP addresses. A recognition and matching service 106 may receive information related to music and/or audio from a client device (e.g., client devices 102, 104). The recognition and matching service may use the information received form client devices to fetch (e.g., from one or more databases) content related to the music and/or audio. For example, the recognition and matching service may fetch information about the music and/or audio, or it may fetch one or more videos related to the music and/or audio. The recognition and matching service may return the content to the client device.

Figure 2:
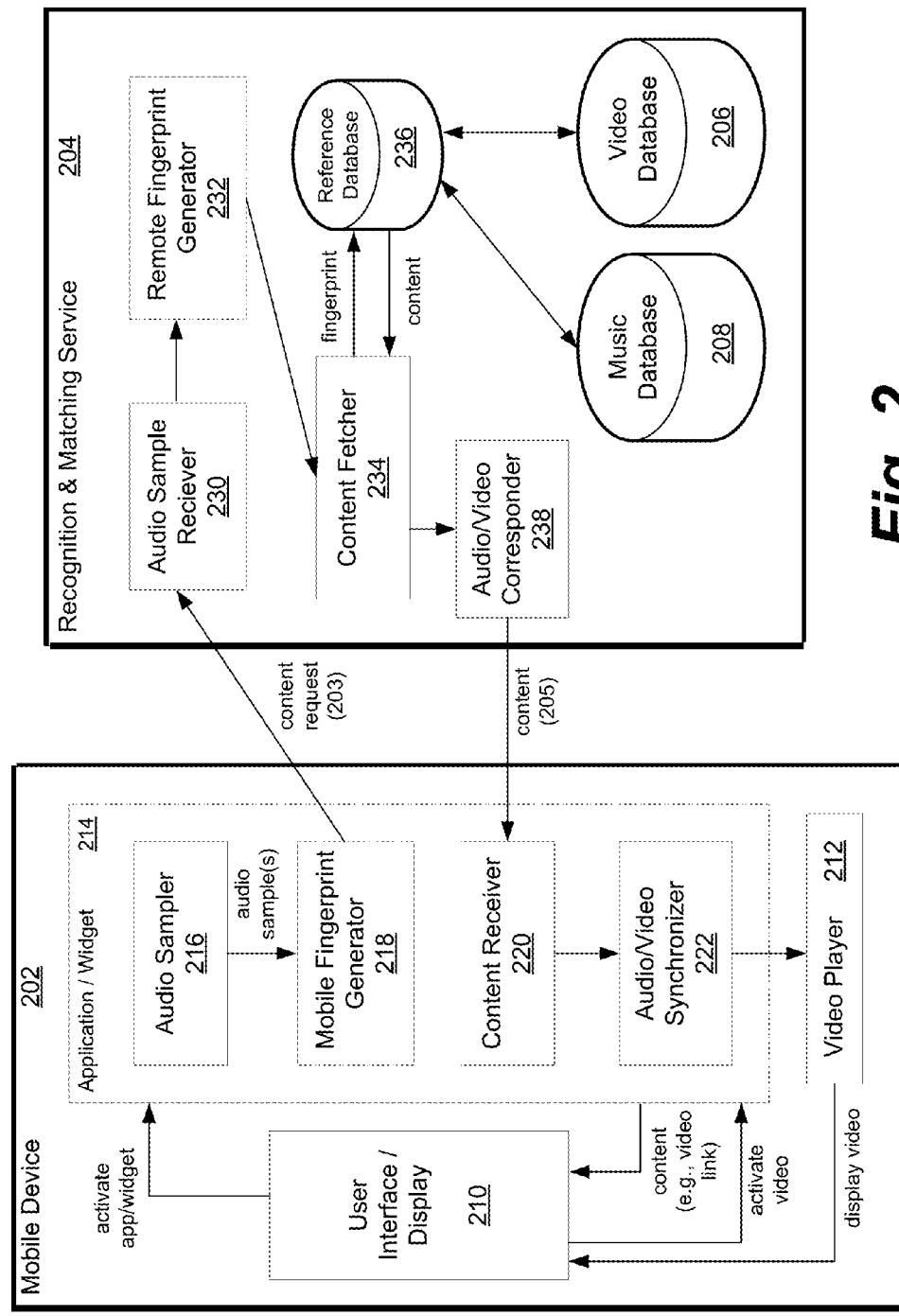
FIG. 2 depicts a block diagram showing example components, modules, routines, connections and interactions of an example mobile device and a recognition and matching service, according to one or more embodiments of the present disclosure.

FIG. 2 depicts a block diagram showing example components, modules, routines, connections and interactions of an example mobile device 202 and a recognition and matching service 204, according to one or more embodiments of the present disclosure. Mobile device 202 may be similar to mobile device 102 of FIG. 1 for example. Mobile device 202 is just one example device that may interact with recognition and matching service 204, and it should be understood that other devices (e.g., personal computers, smart TVs, tablets, PDAs, etc.) may be used in this and other embodiments. Recognition and matching service 204 may be similar to the recognition and matching service 106 of FIG. 1, for example. As can be seen in FIG. 2, recognition and matching service 204 may receive one or more content requests 203 from mobile device 202, and recognition and matching service 204 may return content 205 to mobile device 202. In general, the mobile device 202 may communicate with the recognition and matching service 204 to take advantage of content stored in one or more databases that the recognition and matching service 204 has access to. As one example, the recognition and matching service may include, maintain and/or have access to a video database 206. In this example, mobile device 202 may send a content request 203 to recognition and matching service 204 and may receive a video (e.g., a link/URL to an archived video) in return. The mobile device 202 may then download, buffer and/or stream the video by using the link/URL.

Mobile device 202 may include a user interface/display 210, a video player 214 and an application/widget 212. User interface/display 210 may display information (e.g., graphics, images, text, video, etc.) to a user and may receive information (e.g., via a touchscreen and/or buttons) from a user. Video player 212 may read video data and may cause a video to play on the mobile device 202, for example, by communicating with user interface/display 210. Video player 212 may read and play video data that is stored locally (e.g., on a hard drive integrated into the mobile device 202) or video data that is stored remotely (e.g., in video database 206). If video player plays video data that is stored remotely, it may download part or all of the video data (e.g., to the mobile device's hard drive and/or memory) before playing the video data. Video player may stream remote video data, which generally means that the video player may play downloaded portions of the video data while it continues to download remaining portions of the video data.

Application/widget 214 may be a mobile application and/or a widget that runs on a mobile device. The term "mobile application" may refer generally to a software program that runs on a mobile device, where the application may be capable of performing various functionalities and/or may store, access and/or modify data or information. The term "widget" may refer to a software program that runs on a mobile device, where the widget may, among other things, provide a user with an interface to one or more applications, for example, an interface that provides the user with abbreviated access to information and/or functionality when compared to the full user interface offered by the application(s). For example, a widget may display an interface that shows a user various pieces of important information related to an application. As another example, a widget may display an interface that shows a user various functionalities or actions that the user may take with respect to an application. An application may have an associated icon or launch button that allows a user to launch and/or access the application. The icon/launch button may appear on the graphical interface (e.g., on a desktop screen) that a user sees, for example, via user interface/display 210. A widget may have an associated interface that allows a user to interact with and/or access the widget (and/or associated application). The widget interface may appear on the graphical interface (e.g., on a desktop screen) that a user sees, for example, via user interface/display 210. In this respect, as can be seen in FIG. 2, a user may activate (or interact with) application/widget 214 via user interface/display 210.

Application/widget 214 may include various components, modules, routines, connections and interactions. These may be implemented in software, hardware, firmware and/or some combination of one or more of software, hardware and firmware. Application/widget 214 may include an audio sampler 216, a mobile fingerprint generator 218 (optional), a content receiver 220 and/or an audio/video synchronizer 222. Audio sampler 216 may be in communication with a microphone, for example, a microphone that is integrated into mobile device 202. In some embodiments, audio sampler 216 may be in communication with an external microphone, for example, in embodiments where the client device is a desktop computer. Audio sampler 216 may receive and/or detect (e.g., via the microphone) sound in the ambient environment surrounding the mobile device 202. As one specific example, audio sampler 216 may receive and/or detect a song that is playing in a bar or café. In some embodiments, audio sampler 216 may receive and/or detect a song in other ways. For example, audio sampler 216 may detect a song that is playing through a speaker that is integrated or connected to the client device. As another example, audio sampler 216 may read or analyze a song (e.g., the audio data) that is stored on the client device, for example, a song that is stored on the local hard drive of mobile device 202. Audio sampler 216 may receive (e.g., from the microphone) audio data and may interpret and/or format the audio data. Audio sampler 216 may create one or more samples or segments of audio, for example, one or more 10 second samples of a song that is playing in an ambient environment. In this respect, audio sampler 216 may output one or more audio samples, for example, a stream of audio samples while the audio sampler 216 is active. Descriptions herein may use the term "ambient audio" to refer to the audio that is detected by the audio sampler 216, and descriptions herein may use the term "ambient audio sample" to refer to a particular audio sample output by the audio sampler 216. As explained above, the audio sampler 216 may detect audio in other ways, so descriptions that use the terms "ambient audio" and/or "ambient audio sample" should be construed to include audio from other sources as well.

In some embodiments, audio sampler 216 may be part of (or in communication with) broader search and/or "listen" function/application of an operating system. For example, a mobile operating system may include an easily accessible general search and/or listen button/function. This function may allow a user to enter search criteria (or just start listening to surrounding noise). This function may use the search criteria or detected noise to search broadly across many different types of content. For example, a single "listen" search may return metadata about a detected ambient song, a link to buy the song, web search results related to the song (e.g., song, artist, album, genre, etc.), links to map locations (e.g., upcoming shows), and various other types of content.

Figure 3B:
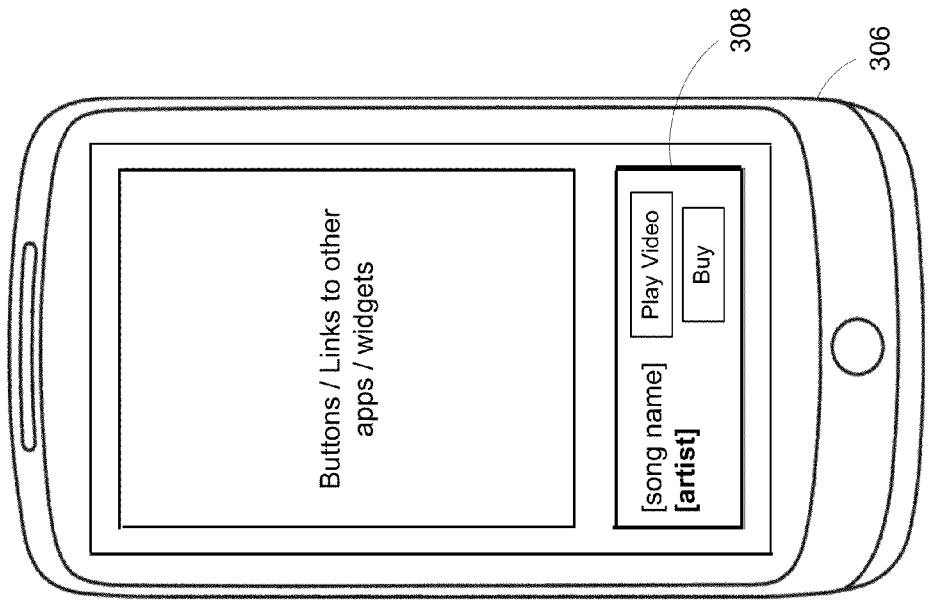
FIG. 3B depicts an illustration of an example display that may show on the screen of a mobile device, according to one or more embodiments of the present disclosure.
Figure 3A:
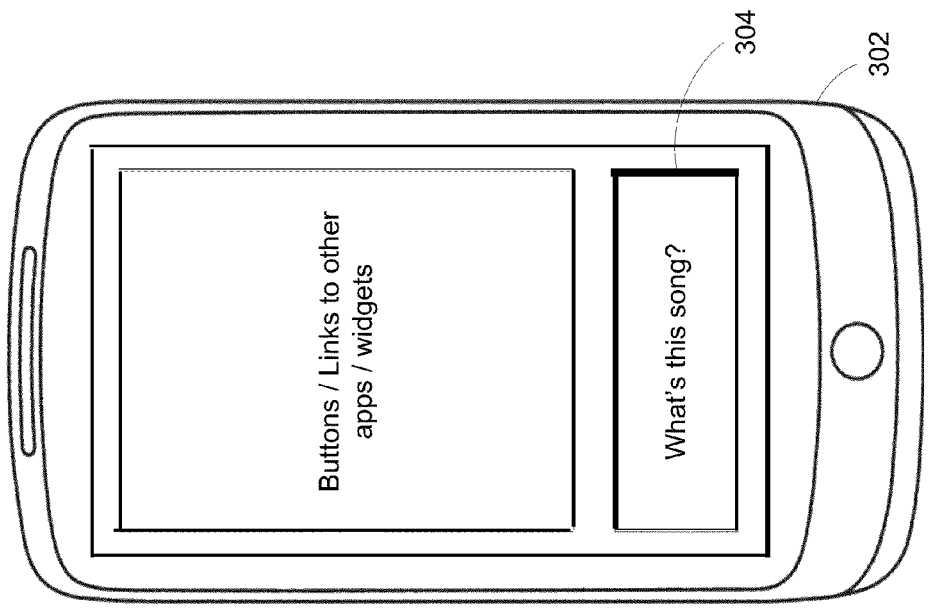
FIG. 3A depicts an illustration of an example display that may show on the screen of a mobile device, according to one or more embodiments of the present disclosure.

The audio sampler 216 may be activated when a user interacts with application/widget 214, e.g., via user interface/display 210. For example, as can be seen in the example of FIG. 3A, mobile device 302 may include a screen that displays an area (e.g., a desktop) where multiple application links/buttons and/or widget interfaces may be displayed. In this example, widget interface 304 may be related to an application for synchronized music and video playback as generally described in this disclosure. In this example, widget interface 304 may display a "ready" mode when the application is waiting for user input to begin audio detection. In this example, the widget interface 304 may be a button, for example, with text (e.g., "What's this song?") that informs a user that the user can begin audio detection when ready. The user may then touch the widget interface 304 to activate the audio sampler 216. For example, a user may hear a song playing in a bar and may then touch the widget interface 304, and audio sampler 216 may start to receive audio data (e.g., from a microphone) and may start to create audio sample(s).

At the point where the audio sampler 216 is activated and starts to create ambient audio samples based on an ambient song, the application/widget 214 may read, calculate, determine, save and/or log the timestamp of this event. For example, application/widget 214 may read the system clock of the mobile device (e.g., related to the operating system running on the mobile device). This timestamp may be referred to as the "recognition time" or the "initial timestamp" (see FIG. 4, label 402) for example, meaning the time when audio sampling begins for a particular song. In other words, this is the time when the audio sampler starts receiving and/or capturing the first ambient audio sample from the integrated microphone. It should be understood that this recognition time or initial timestamp may indicate a time that is after the beginning time of an ambient song (e.g., in the middle of the song). Referring again to FIG. 2, this initial timestamp may be saved or logged by the audio sampler 216, by the audio/video synchronizer 222 or by some other component, module or the like of application/widget 214. This initial timestamp may be used later on by application/widget 214 (e.g., by audio/video synchronizer 222) to perform calculations, algorithms or the like to synchronize video (e.g., received from the recognition and matching service 204) with the ambient audio being sampled.

Referring again to FIG. 2, application/widget 214 may include a mobile fingerprint generator 218. Mobile fingerprint generator 218 may receive one or more ambient audio samples from audio sampler 216. Mobile fingerprint generator 218 may perform one or more algorithms, routines or the like on the ambient audio sample(s) to generate one or more audio fingerprints. These audio fingerprint algorithms, routines or the like may be similar to the algorithms, routines or the like described below with regard to remote fingerprint generator 232. If application/widget 214 includes a mobile fingerprint generator 218, the audio fingerprints generated by mobile fingerprint generator 218 may be communicated to the recognition and matching service 204. In these embodiments, content request 203 may include one or more audio fingerprints. In some embodiments of the present disclosure, application/widget 214 may not include a mobile fingerprint generator 218, in which case the ambient audio sample(s) generated by audio sampler 216 may be communicated to the recognition and matching service 204 (e.g., instead of audio fingerprints being sent). In these embodiments, content request 203 may include one or more ambient audio samples. In these embodiments, the mobile device may compress the ambient audio samples before communicating them to the recognition and content matching service 204. In some embodiments, the content request 203 may include streaming information, for example, streaming ambient audio samples or audio fingerprints. The term streaming information may generally refer to information that sent in a substantially continuously flow, whereby changes that occur at the transmitting end (e.g., the mobile device 202) are communicated in real-time (e.g., shortly after the changes occur) to the receiving end (e.g., the recognition and matching service 204).

Recognition and matching service 204 may receive one or more content requests 203 from one or more mobile devices 202 (or other devices such as computers, etc.). Recognition and matching service 204 may return information related to the content request(s) to the mobile device(s) 202 or other devices that transmitted the request. For example, if a mobile device transmitted an ambient audio sample, the recognition and matching service 204 may return information about a matching song (e.g., a song in one or more databases accessible by the recognition and matching service 204). Recognition and matching service 204 may include an audio sample receiver 230, a remote fingerprint generator 232 (optional), a content fetcher 234 and/or an audio/video corresponder 238. Recognition and matching service 204 may include or have access to a reference database 236, a video database 206 and/or a music database 208. Audio sample receiver 230 may receive one or more content requests 203 from one or more mobile devices 202 (or other devices such as computers, etc.). Audio sample receiver 230 may interpret and/or format the content request, for example, by extracting one or more ambient audio samples and/or audio fingerprints.

Recognition and matching service 204 may include a remote fingerprint generator 232. For example, if the client devices (e.g., mobile device 202) do not generate audio fingerprints, then the remote fingerprint generator 232 may generate audio fingerprints for ambient audio samples received from the client devices. Remote fingerprint generator 232 may receive one or more ambient audio samples from audio sample receiver 230. Remote fingerprint generator 232 may perform one or more algorithms, routines or the like on the audio sample(s) to generate one or more audio fingerprints. These audio fingerprint algorithms, routines or the like may be similar to the algorithms, routines or the like used by the mobile fingerprint generator 218; therefore, the fingerprinting descriptions that follow may apply to the mobile fingerprint generator 218 (if it exists on a mobile device) as well as the remote fingerprint generator 232.

Remote fingerprint generator 232 may perform one or more algorithms, routines or the like on the ambient audio sample(s) to generate one or more audio fingerprints. These algorithms, routines or the like may create fingerprints that are optimal for lookup and/or matching routines, for example, routines that search through large databases to find matching fingerprints. In this respect, the fingerprints may be compact and discriminative to allow efficient matching on a large scale (e.g., many comparisons). Various audio fingerprinting algorithms may be used for the present disclosure. Various audio fingerprinting algorithms may use spectrograms. The term "spectrogram" may generally refer to a time-frequency graph that distinctly represents an audio sample. The time-frequency graph may include one axis for time, one axis for frequency and a third axis for intensity. Each point on the graph may represent the intensity of a given frequency at a specific point in time. The graph may identify frequencies of peak intensity, and for each of these peak points it may keep track of the frequency and the amount of time from the beginning of the track. One example audio fingerprinting algorithm may be described in the following paper: "Content Fingerprinting Using Wavelets," by Baluj a and Covell (2006).

Content fetcher 234 may receive one or more fingerprints from remote fingerprint generator 232, or from audio sample receiver 230, for example, if audio fingerprinting is performed by client devices (e.g., mobile device 202). Content fetcher 234 may use the fingerprint(s) to query one or more databases, for example, reference database 236. For example, content fetcher 234 may send one or more fingerprints to reference database 236, and may receive in return information (e.g., a video) related to the audio sample used to generate the fingerprint.

Reference database 236 may include a large number of audio fingerprints, for example, where each fingerprint is an index that is associated with content (e.g., music, video, metadata, etc.). The reference database 236 may include fingerprints for all songs which can be recognized by the recognition and matching service 204. The term "recognize" or "recognition" may refer to the ability to return content related to a song, for example, metadata about a song (e.g., song name, artist, etc.), or a video related to the song. Upon receiving an audio fingerprint (e.g., from content fetcher 234), reference database may perform a comparison/matching routine between the received fingerprint and the various fingerprints stored in the reference database 236. Various audio fingerprint comparison/matching algorithms may be used for the present disclosure. One example audio fingerprint comparison/matching algorithm may be described in the following paper: "Content Fingerprinting Using Wavelets," by Baluja and Covell (2006). In this respect, the reference database 236 may perform index lookups using received fingerprints to determine whether matching content exists in (or is accessible by) the recognition and matching service 204.

If a fingerprint match occurs in the reference database 236 (as a result of an index lookup), the reference database 236 may fetch associated content (e.g., from one or more other databases) and return the content to the content fetcher 234. For example, each fingerprint index in the reference database may be associated with information regarding where to retrieve content from one or more other databases (e.g., a music database and/or a video database). In some embodiments, the content may be stored directly in the reference database and may be directly correlated to the fingerprint indices. In the embodiments where the content is stored in one or more additional databases (e.g., music database 208, video database 206), the reference database may query these databases in response to a fingerprint index lookup. For example, if a fingerprint sent from content fetcher 234 matches an index fingerprint in references database 236, the reference database may then use information associated with the index to query video database 206. For example, reference database may send the same fingerprint to video database 206 (if video database is indexed by fingerprints) and may receive in return information (e.g., a link/URL) about the associated video. In some embodiments, metadata may be used instead of or in conjunction with fingerprints to query the additional databases (e.g., the video database 206). For example, reference database 236 may send the song name and artist to video database 206 and may receive in return information about the associated video.

Video database 206 may be a large, comprehensive database of video files/data. Video database 206 may be a general video database and may be used by other services beyond just the recognition and matching service 204. For example, video database 206 may be used by a cloud video service, where videos (e.g., music videos of songs) are uploaded and viewed by users, for example, via a web interface. Videos in the video database 206 may have been processed or preprocessed, meaning that the general content and metadata of the video may have been determined. For example, music videos or concert videos in the video database 206 may have been processed to determine which song, band, album, etc. the video relates to. As another example, music videos or concert videos in the video database 206 may have been processed to link the videos to appropriate places on the web where a user can purchase a digital version of the associated song. As another example, music videos or concert videos in the video database 206 may have been processed to associate the video with information about where the artist in the video will play shows/concerts, e.g., shows/concerts in the geographic area of a user. As another example, music videos or concert videos in the video database 206 may have been processed to associate the video with richer information about the artist, such as background information about the artist, dates and locations of upcoming concerts, etc. In this respect, the recognition and matching service may access and take advantage of huge amounts of data that have been accumulated and processed for multiple purposes. Music database 208 may be designed in a similar manner to video database 206, for example, in that it may be a general music database that may be accessed by service beyond just the recognition and matching service 204.

The additional databases (e.g., video database 206 and/or music database 208) may index their content in various ways. For example, the databases may index their content by audio fingerprints. In some embodiments, the databases (e.g., the music database 208) may use the same (or similar) fingerprints technology used by the reference database 236 and by fingerprint generators 218 and/or 232. In this respect, using a consistent fingerprint technology may facilitate quick and efficient cross linking between several types of content that may all be related to the same ambient audio sample. If the additional databases are indexed using fingerprints, the reference database may send fingerprints to the databases to perform various queries. In some embodiments, the additional databases (e.g., video database 206 and/or music database 208) may be indexed with metadata (e.g., song/video name, artist, etc.). In this respect, the reference database may send metadata instead of or in combination with fingerprints to the databases to perform various queries.

The additional databases (e.g., video database 206 and/or music database 208) may have multiple pieces of content (e.g., multiple videos) that are indexed with the same information (e.g., the same audio fingerprint). For example, multiple videos may relate to the same song. In these examples, when the additional databases are queried (e.g., by sending an audio fingerprint), the databases may determine which piece of content should be returned. Multiple pieces of content that are related to the same database query may be referred to as "candidates," "candidate content," "candidate videos" or the like. Various algorithms, routines, checks or the like may be used to determine which piece of content from multiple candidates should be returned. For example, if multiple music videos are stored in the video database 206 that relate to the same song (e.g., the music videos have content that includes a version of the song), the most popular video may be selected. "Popularity" may be measures in various ways, for example, number of views per week (e.g., as measured via an associated cloud video web service), the upload source (i.e., does it come directly from a partner), the video's ratings (e.g., as measured via an associated cloud video web service) and the quality of the video. Various other ways of measuring video popularity or selecting from a plurality of videos may be used. The algorithms, routines, checks or the like used to determine which piece of content should be selected may be performed in the additional databases (e.g., video database 206 and/or music database 208), in the reference database 236, in the content fetcher 234 or in any other module, component or the like. Once it is determined which video should be returned in response to a query, the determined video may be communicated to the content fetcher. This determined video may be referred to as the "reference video", meaning that the video is uniquely associated with the content request (e.g., 203), and more specifically, with a particular ambient audio sample.

Audio/video corresponder 238 may receive content from content fetcher 234, for example, content (e.g., a reference video) related to an ambient audio sample or audio fingerprint. Audio/video corresponder 238 may perform various algorithms, calculations, routines and/or the like to aid in correspondence and/or synchronization between the content (e.g., the reference video) and the ambient audio sample. For example, audio/video corresponder 238 may determine the earliest common correspondence point (e.g., shown in FIG. 4 at label 410) between a reference video and a related ambient audio sample. For various reasons, the start of the ambient audio sample (e.g., shown in FIG. 4 at label 402) and the start of the reference video (e.g., shown in FIG. 4 at label 408) may not relate to the same point in the song. For example, the reference video (e.g., a music video) may include an introduction before the song starts. As another example, the ambient audio sample may have been captured after the start of the song. As another example, the ambient audio sample may have some excessive noise at the beginning of the sample, for example, due to movement of the mobile device by a user. Once a common correspondence point is determined, the video and the audio sample may correspond (e.g., substantially) from that point onward. For example, t=2.4 s onwards in the audio sample may match t=80.2 s onwards in the video. Various techniques may be used to discriminate between multiple correspondence points that at least initially appear to work. For example, the algorithm may proceed through the song until a more discriminative portion of the sample/video occurs (e.g., at a verse instead of a chorus). Additionally, even multiple choruses in a song may have subtle differences. In some embodiments, the information necessary to start streaming the video may be sent to the mobile device and corrected information may be sent if it is determined that an error was made. Various other method of finding a common correspondence may be used.

Figure 4:
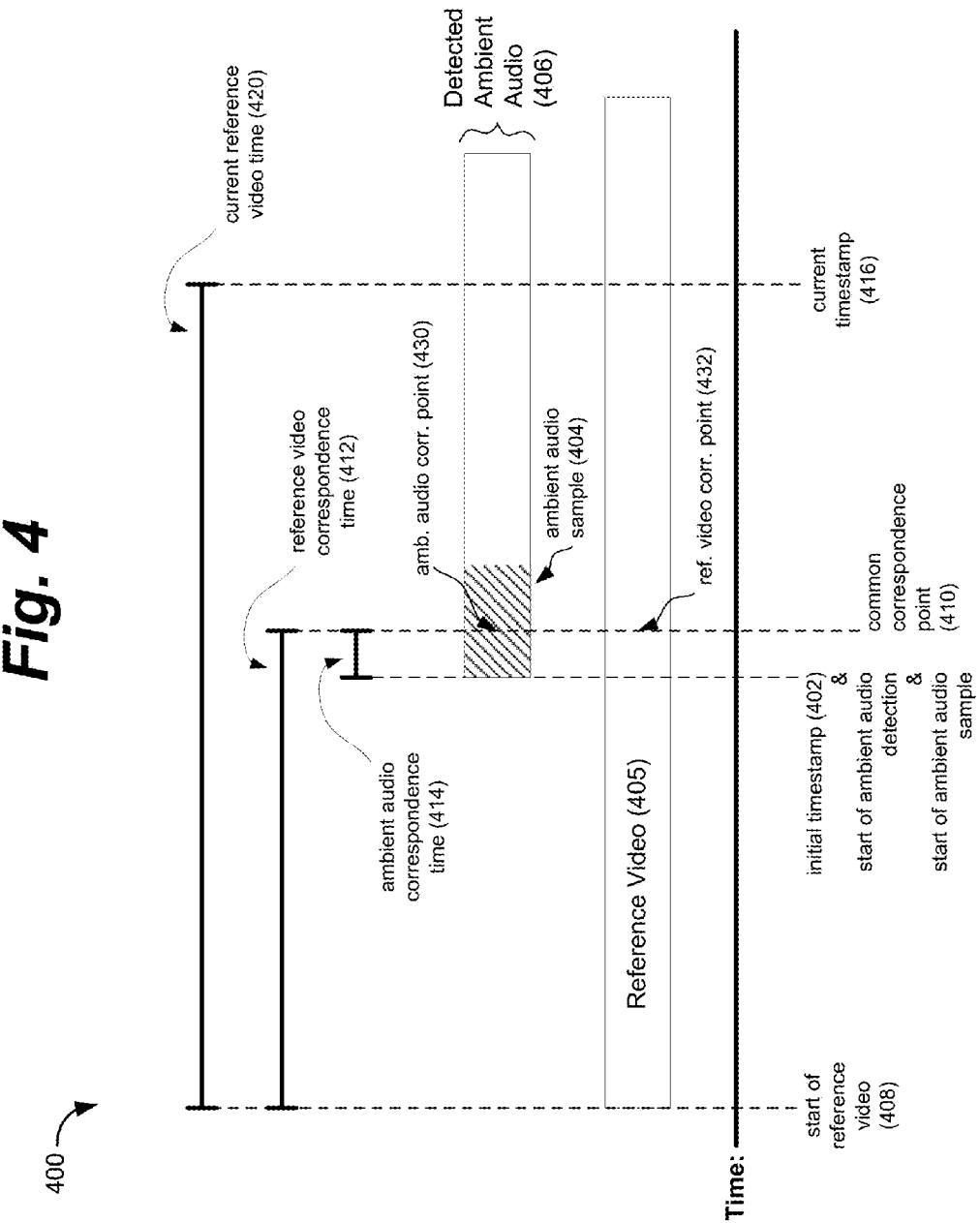
FIG. 4 depicts a chart that shows the concept behind example calculations that may be performed by an audio/video synchronizer, according to one or more embodiments of the present disclosure.

Once the audio/video corresponder 238 determines the earliest common correspondence point between a reference video and a related ambient audio sample, the audio/video corresponder 238 may determine the ambient audio correspondence time (e.g., shown in FIG. 4 at label 414) and the reference video correspondence time (e.g., shown in FIG. 4 at label 412). The ambient audio correspondence time may refer to the amount of time between the start of the ambient audio sample and the common correspondence point. The reference video correspondence time may refer to the amount of time between the start of the reference video and the common correspondence point. FIG. 4 is explained in more detail below. Audio/video corresponder 238 may also determine whether a playback speed mismatch exists between the ambient audio sample and the reference video, e.g., the ambient audio sample is stretched or compressed relative to the reference video. In order to use a common parameter/variable, a "stretch factor" may be determined with respect to either the ambient audio sample or the reference video. For example a "stretch of sample" parameter/value may be determined. As one specific example, the stretch of sample may be 1.01, which may indicate an ambient audio sample slow-down of 1% relative to the reference video.

Content receiver 220 (in mobile device 202) may receive content 205 from recognition and matching service 204, e.g., in response to a content request 203 sent by the mobile device 202. For example, mobile device (e.g., via application/widget 214) may send a content request 203 that includes one or more ambient audio samples. Recognition and matching service 204 may perform various algorithms, routines, database queries and/or the like and may return content 205 to the mobile device. Content 205 may include various pieces of information related to the content request 203 (e.g., related to the ambient audio sample(s)). For example, content 205 may include metadata (e.g., song name, artist, album name, etc.) about the song from which the ambient audio sample was captured. As another example, content 205 may include information about a video (e.g., a reference video) that is related to the audio sample. The video may be, for example, a video that was previously uploaded to a cloud video service, where the video is a music video that contains a version of the song related to the ambient audio sample. Content 205 may include video data (which may be directly used to play the video on the mobile device 202) or may include a link/URL to video data that is stored on a remote server such that the video data may be downloaded subsequently. Other types of content may be returned as well. For example, a link to buy a digital version of the song and/or general web search results related to the song (e.g., related to the artist, album, specific song, genre of the song, etc.).

As part of the content (205) returned by the recognition and matching service 204 to the mobile device 202, various pieces of information may be returned that aid in correspondence and/or synchronization between the content (e.g., a reference video) and the ambient audio. For example, a common correspondence point as determined by the audio/video corresponder 238 may be returned. As another example, the ambient audio correspondence time as determined by the audio/video corresponder 238 may be returned. As another example, the reference video correspondence time as determined by the audio/video corresponder 238 may be returned. As another example, the stretch factor (e.g., "stretch of sample") as determined by the audio/video corresponder 238 may be returned. The mobile device 202 may use these pieces of information to synchronize the returned reference video with the ambient audio, as explained more below.

Content receiver 220 may interpret the content 205 and may format the content 205 for display to a user, for example, via user interface/display 210. FIG. 3B shows one example of how content may be displayed to a user. FIG. 3B shows a mobile device 306 with a display that displays a widget interface 308. In this example, widget interface 308 may display information about a song (e.g., related to an audio sample captured by mobile device 306). Widget interface 308, for example, may display metadata about the song, e.g., song name and artist. Widget interface 308 may also display a link that allows a user to buy a digital version of the song. Widget interface 308 may also display (or link to, or cause a page to display) web search results related to the song (e.g., related to the artist, album, specific song, genre of the song, etc.). Widget interface 308 may also display a link to play a video (e.g., the reference video) related to the song/ambient audio. Referring again to FIG. 2, if a user touches the "play video" link (e.g., shown in FIG. 3B), the user interface/display 210 may send a signal to the application/widget 214 to activate the video. Then, application/widget 214 may cause video player 212 to play the reference video, for example, by reading video data received via content 205 or video data downloaded from a remote server (e.g., using a URL/link provided in content 205).

Application/widget 214 may prepare to play a video, for example, before, during and/or shortly after receiving a video activation signal (e.g., from user interface/display 210). Preparing to play a video may include performing various algorithms, calculations, routines and/or the like to synchronize a video with an ambient song that was detected (or is being detected) by mobile device 202. Audio/video synchronizer 222 may synchronize a video (e.g., a reference video received by recognition & matching service 204) with an ambient song (e.g., that was detected or is being detected by mobile device 202). Audio/video synchronizer 222 may perform various algorithms, calculations, routines and/or the like to synchronize a video and audio. Audio/video synchronizer 222 may receive various inputs (e.g., data, values, etc.) that may be used to perform such synchronization algorithms, calculations, routines and/or the like. For example, audio/video synchronizer 222 may receive various pieces of information determined by the audio/video corresponder 238 as described above. For example, audio/video synchronizer 222 may receive a common correspondence point, an ambient audio correspondence time, a reference video correspondence time and a stretch factor (e.g., stretch of sample). Audio/video synchronizer 222 may use these inputs (and optionally other inputs) and may perform additional algorithms, calculations, routines and/or the like to synchronize a reference video with an ambient song. It should be understood that breakdown of algorithms, calculations, value determinations and the like that are attributed to the audio/video corresponder 238 as opposed to the audio/video synchronizer 222 as described herein is just one example implementation. In other embodiments, some of the calculations performed in one of these modules may be performed in the other module, and vice versa. In other embodiments, any of the calculations described with regard to the audio/video corresponder 238 and/or the audio/video synchronizer 222 may be performed by any combination of modules that exist in either the mobile device 202 and/or the recognition and matching service 204.

Audio/video synchronizer 222 may perform various algorithms, calculations, routines and/or the like and may use the various input described above to synchronize a received reference video with ambient audio. The audio/video synchronizer 222 may be able to determine the appropriate playback time of the received reference video regardless of amount of time that has passed between the start of the ambient audio detection and the current time (e.g., current timestamp), assuming the ambient song is still playing. In this respect, the audio/video synchronizer 222, once it has received inputs from the audio/video corresponder 238, may have all the information it needs to determine the proper (e.g., synched) reference video playback time even if the user waits a period of time before starting playback of the video. In other words, the audio/video synchronizer 222 can handle an arbitrary delay between receiving the content and starting playback. FIG. 4 depicts a chart 400 that shows the concept behind example calculations that may be performed by the audio/video synchronizer 222.

As can be seen in FIG. 4, various pieces of information that have already been discussed above are represented on the chart 400. For example, the initial timestamp 402 as was logged by the mobile device at the start of ambient audio detection is shown. This initial timestamp 402 also coincides with the beginning of an example ambient audio sample 404, e.g., that was sent to a recognition and matching service. Ambient audio sample 404 is a sampled portion of a larger detected ambient audio segment 406. Chart 400 also includes various values that may have been calculated by the audio/video corresponder 238, for example, the start of the reference video 408 (related to reference video 405) and the common correspondence point 410. Common correspondence point 410 actually creates two correspondence points, a first correspondence point (i.e., ambient audio correspondence point 430) and a second correspondence point (i.e., reference video correspondence point 432). Chart 400 also shows the reference video correspondence time 412, which is calculated as the difference between the start of the reference video 408 and the reference video correspondence point 432. Chart 400 also shows the ambient audio correspondence time 414, which is calculated as the difference between the start of the start of the ambient audio sample (corresponds with time 402) and the ambient audio correspondence point 430. Chart 400 also shows the current time stamp 416, which may be determined by the mobile device 202 (e.g., by reading the system clock) at the point when the video is activated/played. In some embodiments, after the content and synchronization information has been received from the recognition and matching service, the current time stamp 416 may be the only parameter/value that may change up until the point of video playback.

Referring again to FIG. 4, once the content and synchronization information have been received from the recognition and matching service, as described above, at any time thereafter, the current reference video time 420 can be calculated. The current reference video time 420 may provide a playback time of the reference video that is updated in real time as the current time stamp 416 changes. In this respect, the audio/video synchronizer 222 may always determine the proper playback time in the reference video such that the reference video is synched with an associated ambient song that is playing. As one example, the current reference video time 420 may be calculated according to Eq. 1 below, where variables are labeled and reference numbers correspond with FIG. 4.

$$CRVT = [\text{stretch of sample}] * (A - B - C) + D \quad \text{(Eq. 1)}$$

CRVT=current reference video time (420)
A=current time stamp (416)
B=initial time stamp (402)
C=ambient audio correspondence time (414)
D=reference video correspondence time (412)

As explained above, and referring again to FIG. 2, application/widget 214 may prepare to play a video, for example, before, during and/or shortly after receiving a video activation signal (e.g., from user interface/display 210). Preparing to play a video may include pre-fetching, buffering or downloading part or all of the video. The audio/video synchronizer 222 may use Eq. 1 above to optimize the time needed to buffer the video. For example, once the video is received from the recognition and matching service 204, the audio/video synchronizer 222 may calculate CRVT as shown above in Eq. 1, using the current system clock time as A (even if the video playback has not been activated). In this respect, CRVT may represent the earliest conceivable playback time of the reference video, and the mobile device (e.g., via video player 212) may start to buffer/download the video starting at this time. In some examples, the mobile device may skip a few second forward and then start buffering, for example, because it is highly unlikely that the user will activate the video playback (e.g., by touching the play button) immediately upon receiving the content from the recognition and matching service and/or there may be some initial delay before playback can start (e.g., time needed to connect to the streaming server).

Once enough video data has been buffered to allow for continuous playback, the video may be played (e.g., via video player 212) on the mobile device 202. Playback of the video may be initiated by user activation (e.g., touching a play button on the user interface/display 210) or playback of the video may begin automatically once enough buffering has completed. In some embodiments, playback preferences may be saved in a configuration file related to the application/widget 212. Once playback of the video is initiated (e.g., because a user touched a play button), the audio/video synchronizer 222 may once again calculate CRVT (e.g., Eq. 1) to determine the playback time that will be used. Video player 212 may then begin video playback from this point, and the reference video will be substantially synced to the ambient song that is playing.

Certain embodiments of the present disclosure may be found in one or more methods for synchronized content playback related to content recognition. With respect to the various methods described herein and depicted in associated figures, it should be understood that, in some embodiments, one or more of the steps described and/or depicted may be performed in a different order. Additionally, in some embodiments, a method may include more or less steps than are described and/or depicted.

Figure 5:
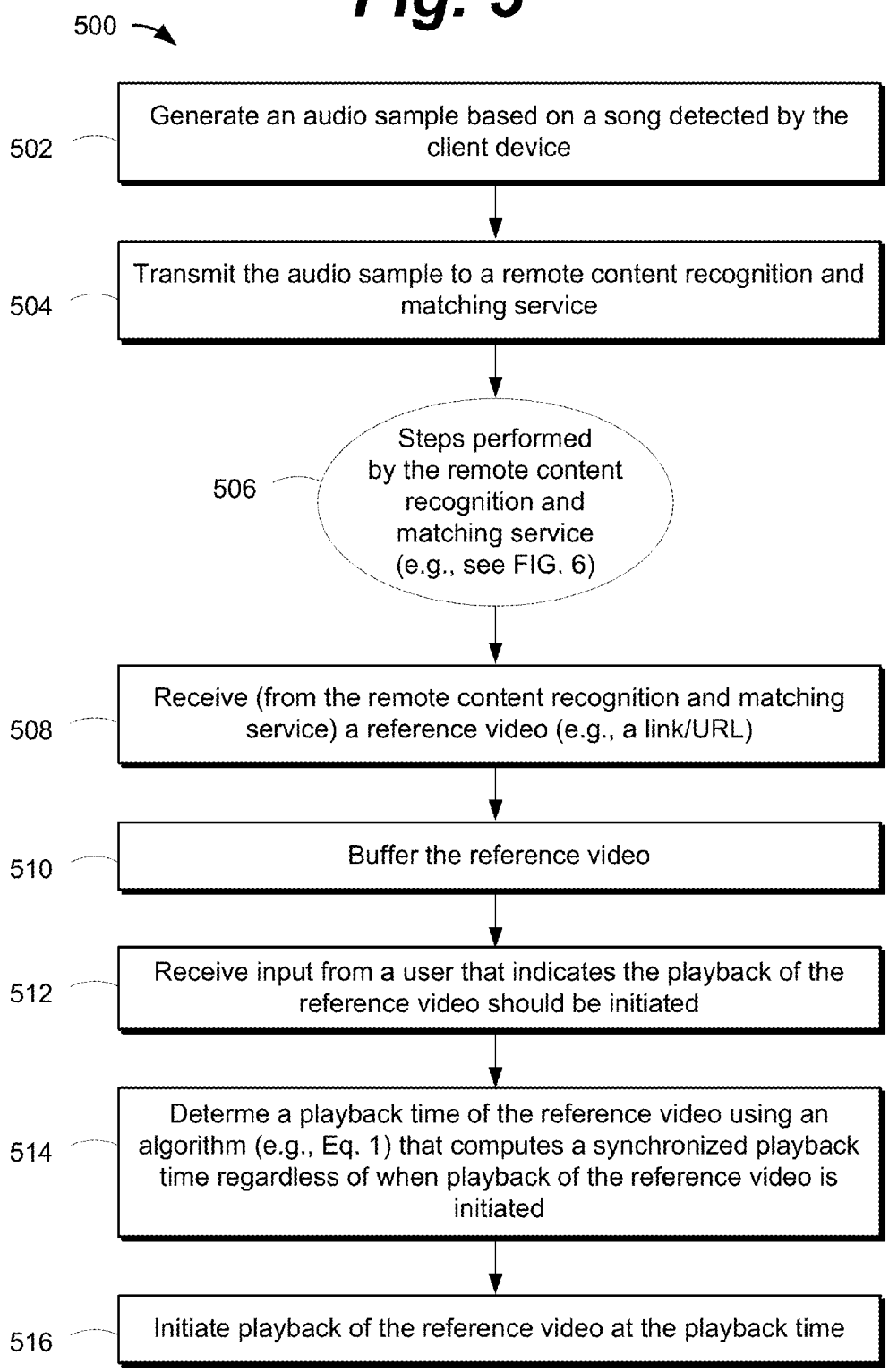
FIG. 5 depicts a flow diagram that shows example steps in a method for synchronized content playback related to content recognition, according to one or more embodiments of the present disclosure.
Figure 6:
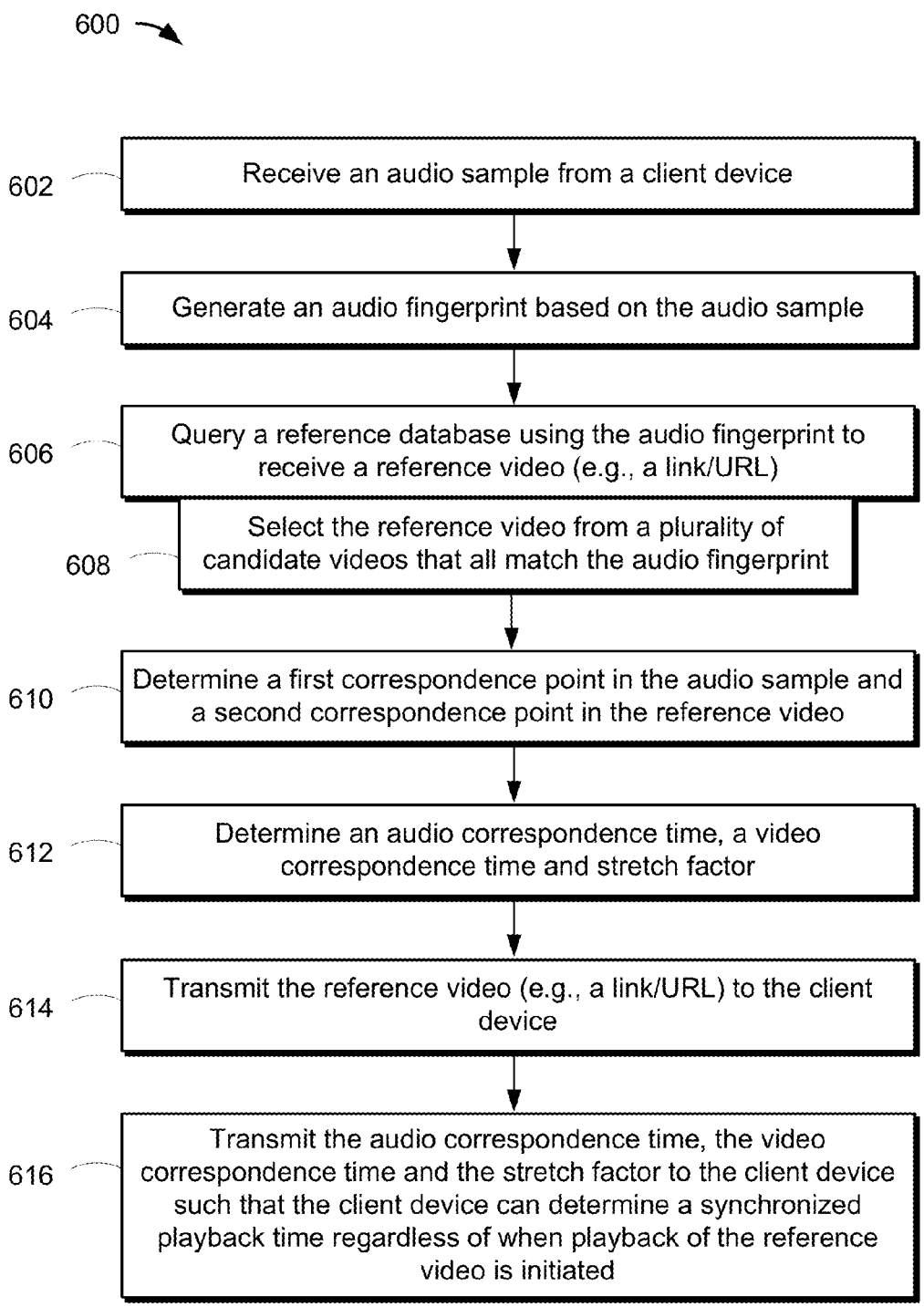
FIG. 6 depicts a flow diagram that shows example steps in a method for synchronized content playback related to content recognition, according to one or more embodiments of the present disclosure.

FIG. 5 depicts a flow diagram 500 that shows example steps in a method for synchronized content playback related to content recognition. In particular, FIG. 5 may show example steps that may be performed by a client device, for example, mobile device 202 of FIG. 2. At step 502, the client device (e.g., via application/widget 216) may generate an audio sample, for example, based on a song detected by the client device. At step 504, the client device may transmit the audio sample to a remote content recognition and matching service (e.g., 204). The remote content and matching service may perform various steps (generally indicated by reference number 506) to identify and return content related to the audio sample. Example steps that may be performed by the remote content and matching service are shown in FIG. 6, and explained in more detail below. At step 508, the client device may receive (from the remote content recognition and matching service) a reference video (e.g., a link/URL) and/or other content. At step 510, the client device may buffer the reference video, as explained in more detail above. At step 512, the client device may receive input from a user that indicates that the playback of the reference video should be initiated. For example, the user may enter input via user interface/display 210. At step 514, the client device may determine a playback time of the reference video, for example, using an algorithm similar to the one shown in Eq. 1. The algorithm may computer a synchronized playback time regardless of when playback of the reference video is initiated. At step 516, playback of the reference video may be initiated, and a video player (e.g., 212) may start to play the reference video on the client device.

FIG. 6 depicts a flow diagram 600 that shows example steps in a method for synchronized content playback related to content recognition. In particular, FIG. 6 may show example steps that may be performed by a remote content recognition and matching service (e.g., 204). At step 602, the remote content recognition and matching service may receive an audio sample from a client device (e.g., mobile device 202 of FIG. 2). At step 604, remote content recognition and matching service may generate an audio fingerprint based on the audio sample, as explained in more detail above. At step 606, remote content recognition and matching service may query a reference database (e.g., 236) using the audio fingerprint and may receive in return a reference video (e.g., a link/URL). At step 608, remote content recognition and matching service may select the reference video from a plurality of candidate videos, as explained in more detail above. Step 608 may be part of step 606 in that the reference database may select the reference video before returning information in response to the query. Alternative, step 608 may be performed outside of the reference database. For example, the reference database may return multiple candidate videos instead of a single reference video, and a module in the remote content recognition and matching service may select the reference video.

At step 610, the remote content recognition and matching service may determine a first corresponding point in the audio sample and a second corresponding point in the reference video, for example, as shown in FIG. 4. At step 612, the remote content recognition and matching service may determine an audio correspondence time and a video correspondence time, for example, as shown in FIG. 4. Also at step 612, the remote content recognition and matching service may determine a stretch factor, as explained in more detail above. At step 614, the remote content recognition and matching service may transmit the reference video (e.g., a link/URL) to the client device. At step 616, the remote content recognition and matching service may transmit the audio correspondence time, the video correspondence time and the stretch factor to the client device, for example, such that the client device can determine a synchronized playback time regardless of when playback of the reference video is initiated.

The methods, routines and solutions of the present disclosure, including the example methods and routines illustrated in the flowcharts and block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. Part or all of the computer code may be loaded into the memory of a data processing system before the data processing system executes the code.

Figure 7:
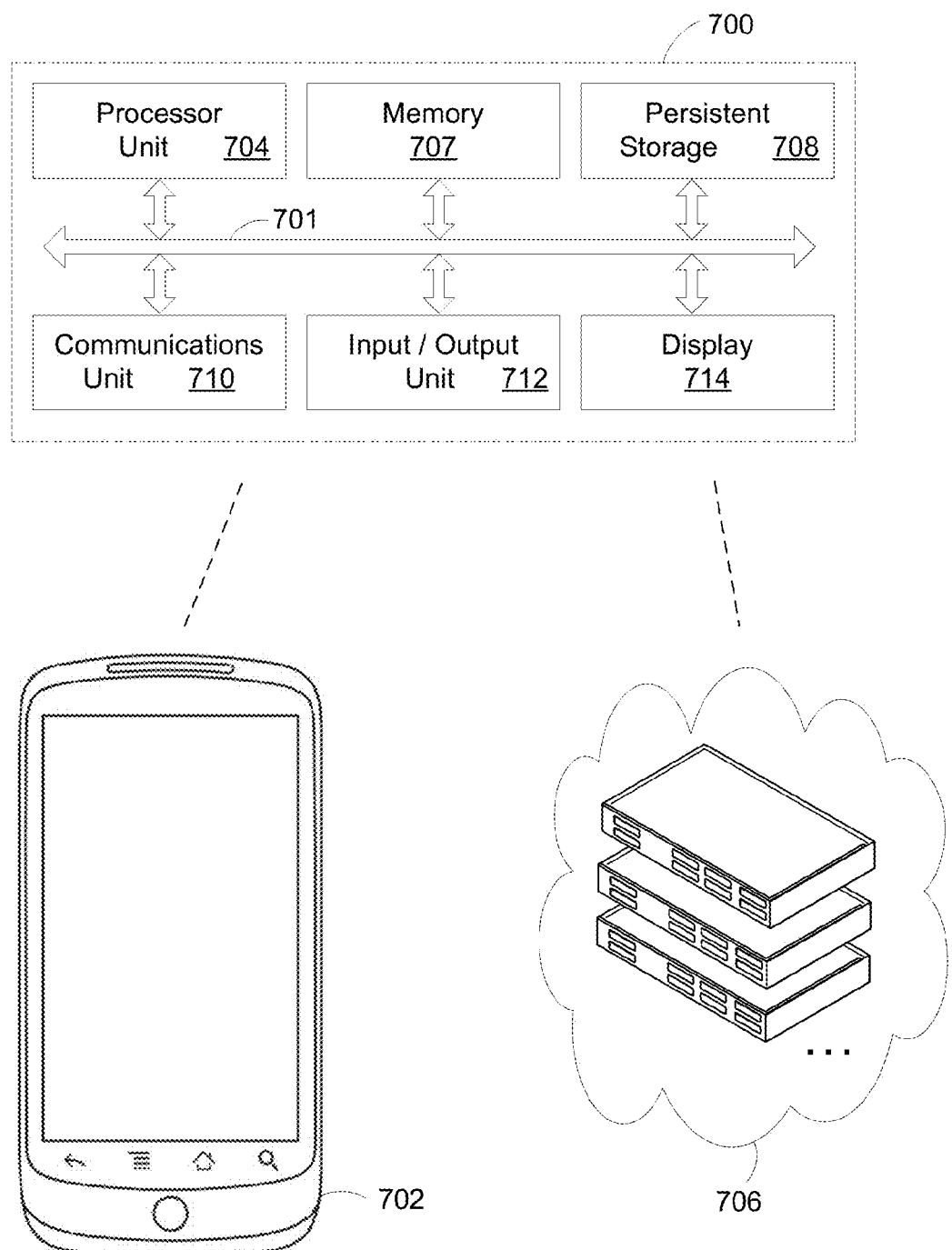
FIG. 7 depicts a block diagram of an example data processing system 700 that may be included within one or more of the client devices described herein (e.g., mobile device 702) and/or included within one or more of the various computers, servers, routers, switches, devices and the like included in a recognition and matching service (e.g., 706) as described herein.

FIG. 7 depicts a block diagram of an example data processing system 700 that may be included within one or more of the client devices described herein (e.g., mobile device 702) and/or included within one or more of the various computers, servers, routers, switches, devices and the like included in a recognition and matching service (e.g., 706) as described herein. The data processing system 700 may be used to execute, either partially or wholly, one or more of the methods, routines and/or solutions of the present disclosure. In some embodiments of the present disclosure, more than one data processing system, for example data processing systems 700, may be used to implement the methods, routines, techniques and/or solutions described herein. In the example of FIG. 7, data processing system 700 may include a communications fabric 701 which provides communications between components, for example a processor unit 704, a memory 707, a persistent storage 708, a communications unit 710, an input/output (I/O) unit 712 and a display 714. A bus system may be used to implement communications fabric 701 and may be comprised of one or more buses such as a system bus or an input/output bus. The bus system may be implemented using any suitable type of architecture that provides for a transfer of data between different components or devices attached to the bus system.

Processor unit 704 may serve to execute instructions (for example, a software program, an application, SDK code, native OS code and the like) that may be loaded into the data processing system 700, for example, into memory 707. Processor unit 704 may be a set of one or more processors or may be a multiprocessor core depending on the particular implementation. Processor unit 704 may be implemented using one or more heterogeneous processor systems in which a main processor is present with secondary processors on a single chip. As another illustrative example, processor unit 704 may be a symmetric multi-processor system containing multiple processors of the same type.

Memory 707 may be, for example, a random access memory or any other suitable volatile or nonvolatile storage device. Memory 707 may include one or more layers of cache memory. Persistent storage 708 may take various forms depending on the particular implementation. For example, persistent storage 708 may contain one or more components or devices. For example, persistent storage 708 may be a hard drive, a solid-state drive, a flash memory or some combination of the above.

Instructions for an operating system may be located on persistent storage 708. In one specific embodiment, the operating system may be some version of a number of known operating systems for computers or for mobile devices or smartphones (e.g, Android, iOS, etc.). Instructions for applications and/or programs may also be located on persistent storage 708. These instructions may be loaded into memory 707 for execution by processor unit 704. For example, the methods and/or processes of the different embodiments described in this disclosure may be performed by processor unit 704 using computer implemented instructions which may be loaded into a memory such as memory 707. These instructions are referred to as program code, computer usable program code or computer readable program code that may be read and executed by a processor in processor unit 704.

Display 714 may provide a mechanism to display information to a user, for example, via a LCD or LED screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 712 allows for input and output of data with other devices that may be connected to data processing system 700. Input/output devices can be coupled to the system either directly or through intervening I/O controllers.

Communications unit 710 may provide for communications with other data processing systems or devices, for example, via one or more networks. Communications unit 710 may be a network interface card. Communications unit 710 may provide communications through the use of wired and/or wireless communications links. In some embodiments, the communications unit may include circuitry that is designed and/or adapted to communicate according to various wireless communication standards, for example, cellular standards, WIFI standards, BlueTooth standards and the like.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown.

Various embodiments of the present disclosure describe one or more systems, methods, routines and/or techniques for synchronized content playback related to content recognition. In one or more embodiments, a method is executed by a data processing system having one or more processors. The method may include generating an audio sample based on a song detected by the data processing system. The method may include transmitting the audio sample to a remote content recognition and matching service. The method may include receiving from the content recognition and matching service, in response to the transmitted audio sample, a reference video link related to a reference video, wherein the reference video includes audio content that includes a version of the song. The method may include initiating playback of the reference video at a playback time such that audio content in the reference video is synchronized with the song. The song may be an ambient song playing in an ambient environment.

In some embodiments, the method may include determining the playback time of the reference video using an algorithm that computes a synchronized playback time regardless of when playback of the reference video is initiated. The algorithm may use an audio correspondence time and a video correspondence time. The audio correspondence time may indicate a time period between the beginning of the audio sample and a first correspondence point, wherein the first correspondence point is a time in the audio sample where the audio sample matches the audio content in the reference video. The video correspondence time may indicate a time period between the beginning of the reference video and a second correspondence point, wherein the second correspondence point is a time in the reference video where the audio content in the reference video matches the song at the first correspondence point. In some embodiments, the algorithm may determining a current timestamp (A) that indicates a time when playback of the reference video is initiated, recalling an initial timestamp (B) that indicates a time when the data processing system started to detect the song, receiving the audio correspondence time (C), receiving the video correspondence time (D), receiving a stretch factor that indicates the difference in playback speed between the song and the reference video, and computing the playback time as [the stretch factor]*(A−B−C)+D. In some embodiments, the method may include buffering the reference video by downloading the reference video using the reference video link, wherein the download of the reference video is started at a time point in the reference video that is after the beginning of the reference video. In some embodiments, the method may include displaying on a screen of the data processing system a button or link that causes the reference video to play when a user interacts with the button or link, receiving input from a user in response to a user interacting with the button or link, and determining the playback time of the reference video after the input from the user is received.

In one or more embodiments of the present disclosure, a method may be executed by a data processing system having one or more processors. The method may include receiving an audio sample from a client device, wherein the audio sample was generated by the client device based on a song detected by the client device. The method may include generating an audio fingerprint based on the audio sample. The method may include querying a reference database using the audio fingerprint to receive a reference video link related to a reference video stored in a video database. The data processing system may include or be in communication with the video database. The reference video may include audio content that includes a version of the song. The method may include transmitting the reference video link to the client device, in response to the received audio sample. The audio fingerprint may be generated according to a fingerprint technology that is the same fingerprint technology used to identify videos in the video database. The audio fingerprint may be generated according to a fingerprint technology that is the same fingerprint technology used to identify songs and song metadata in a music database. The query of the reference database may include selecting the reference video from a plurality of candidate videos that all match the audio fingerprint.

In some embodiments, the method may include determining a first correspondence point in the audio sample and a second correspondence point in the reference video, wherein the audio sample from the first correspondence point onward is substantially synchronized with the audio content of the reference video from the second correspondence point onward. The method may include determining an audio correspondence time indicates a time period between the beginning of the audio sample and a first correspondence point. The method may include determining a video correspondence time indicates a time period between the beginning of the reference video and a second correspondence point. The method may include transmitting the audio correspondence point and the video correspondence point to the client device such that the client device can compute a synchronized playback time of the reference video regardless of when playback of the reference video is initiated. The method may include determining a stretch factor that indicates a playback speed mismatch between the audio sample and the reference video. The method may include transmitting the stretch factor to the client device such that the client device can compute a synchronized playback time of the reference video.

One or more embodiments of the present disclosure describe a data processing system comprising one or more memory units that store computer code, and one or more processor units coupled to the one or more memory units. The one or more processor units may execute the computer code stored in the one or more memory units to adapt the data processing system to receive an audio sample from a client device, wherein the audio sample was generated by the client device based on a song detected by the client device. The data processing system may be further adapted to generate an audio fingerprint based on the audio sample. The data processing system may be further adapted to query a reference database using the audio fingerprint to receive a reference video link related to a reference video stored in a video database, wherein the data processing system includes or is in communication with the video database, and wherein the reference video includes audio content that includes a version of the song. The data processing system may be further adapted to transmit the reference video link to the client device, in response to the received audio sample. The audio fingerprint may be generated according to a fingerprint technology that is the same fingerprint technology used to identify videos in the video database. The audio fingerprint may be generated according to a fingerprint technology that is the same fingerprint technology used to identify songs and song metadata in a music database.

In some embodiments, the data processing system may be further adapted to determine a first correspondence point in the audio sample and a second correspondence point in the reference video, wherein the audio sample from the first correspondence point onward is substantially synchronized with the audio content of the reference video from the second correspondence point onward. The data processing system may be further adapted to determine an audio correspondence time indicates a time period between the beginning of the audio sample and a first correspondence point. The data processing system may be further adapted to determine a video correspondence time indicates a time period between the beginning of the reference video and a second correspondence point. The data processing system may be further adapted to transmit the audio correspondence point and the video correspondence point to the client device such that the client device can compute a synchronized playback time of the reference video regardless of when playback of the reference video is initiated. The data processing system may be further adapted to determine a stretch factor that indicates a playback speed mismatch between the audio sample and the reference video. The data processing system may be further adapted to transmit the stretch factor to the client device such that the client device can compute a synchronized playback time of the reference video.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A method executed by a data processing system having one or more processors, the method comprising:
   generating an audio sample based on a song detected by the data processing system;
   transmitting the audio sample to a remote content recognition and matching service;
   receiving from the content recognition and matching service, in response to the transmitted audio sample, a reference video link related to a reference video, wherein the reference video includes audio content that includes a version of the song;
   initiating playback of the reference video at a playback time such that audio content in the reference video is synchronized with the song; and
   determining the playback time of the reference video using an algorithm that computes a synchronized playback time regardless of when playback of the reference video is initiated,
   wherein the algorithm uses an audio correspondence time and a video correspondence time,
   wherein the audio correspondence time indicates a time period between the beginning of the audio sample and a first correspondence point, wherein the first correspondence point is a time in the audio sample where the audio sample matches the audio content in the reference video, and
   wherein the video correspondence time indicates a time period between the beginning of the reference video and a second correspondence point, wherein the second correspondence point is a time in the reference video where the audio content in the reference video matches the song at the first correspondence point.

2. The method of claim 1, wherein the algorithm comprises:
   determining a current timestamp (A) that indicates a time when playback of the reference video is initiated;
   recalling an initial timestamp (B) that indicates a time when the data processing system started to detect the song;
   receiving the audio correspondence time (C);
   receiving the video correspondence time (D);
   receiving a stretch factor that indicates the difference in playback speed between the song and the reference video; and
   computing the playback time as [the stretch factor]*(A−B−C)+D.

3. The method of claim 1, further comprising buffering the reference video by downloading the reference video using the reference video link, wherein the download of the reference video is started at a time point in the reference video that is after the beginning of the reference video.

4. The method of claim 1, further comprising:
   displaying on a screen of the data processing system a button or link that causes the reference video to play when a user interacts with the button or link;
   receiving input from a user in response to a user interacting with the button or link; and determining the playback time of the reference video after the input from the user is received.

5. A method executed by a data processing system having one or more processors, the method comprising:
receiving an audio sample from a client device, wherein the audio sample was generated by the client device based on a song detected by the client device;
generating an audio fingerprint based on the audio sample;
querying a reference database using the audio fingerprint to receive a reference video link related to a reference video stored in a video database, wherein the data processing system includes or is in communication with the video database, and wherein the reference video includes audio content that includes a version of the song;
transmitting the reference video link to the client device, in response to the received audio sample;
determining a first correspondence point in the audio sample and a second correspondence point in the reference video, wherein the audio sample from the first correspondence point onward is substantially synchronized with the audio content of the reference video from the second correspondence point onward;
determining an audio correspondence time that indicates a time period between the beginning of the audio sample and a first correspondence point;
determining a video correspondence time that indicates a time period between the beginning of the reference video and a second correspondence point; and
transmitting the audio correspondence point and the video correspondence point to the client device such that the client device can compute a synchronized playback time of the reference video regardless of when playback of the reference video is initiated.

6. The method of claim 5, wherein the audio fingerprint is generated according to a fingerprint technology that is the same fingerprint technology used to identify videos in the video database.

7. The method of claim 5, wherein the audio fingerprint is generated according to a fingerprint technology that is the same fingerprint technology used to identify songs and song metadata in a music database.

8. The method of claim 5, wherein the query of the reference database includes selecting the reference video from a plurality of candidate videos that all match the audio fingerprint.

9. The method of claim 5, further comprising:
determining a stretch factor that indicates a playback speed mismatch between the audio sample and the reference video; and
transmitting the stretch factor to the client device such that the client device can compute a synchronized playback time of the reference video.

10. A data processing system, comprising:
one or more memory units that store computer code; and
one or more processor units coupled to the one or more memory units, wherein the one or more processor units execute the computer code stored in the one or more memory units to adapt the data processing system to:
receive an audio sample from a client device, wherein the audio sample was generated by the client device based on a song detected by the client device;
generate an audio fingerprint based on the audio sample;
query a reference database using the audio fingerprint to receive a reference video link related to a reference video stored in a video database, wherein the data processing system includes or is in communication with the video database, and wherein the reference video includes audio content that includes a version of the song; and
transmit the reference video link to the client device, in response to the received audio sample,
wherein the one or more processor units execute the computer code stored in the one or more memory units to adapt the data processing system to determine a first correspondence point in the audio sample and a second correspondence point in the reference video, wherein the audio sample from the first correspondence point onward is substantially synchronized with the audio content of the reference video from the second correspondence point onward, and
wherein the one or more processor units execute the computer code stored in the one or more memory units to:
determine an audio correspondence time that indicates a time period between the beginning of the audio sample and a first correspondence point;
determine a video correspondence time that indicates a time period between the beginning of the reference video and a second correspondence point; and
transmit the audio correspondence point and the video correspondence point to the client device such that the client device can compute a synchronized playback time of the reference video regardless of when playback of the reference video is initiated.

11. The data processing system of claim 10, wherein the audio fingerprint is generated according to a fingerprint technology that is the same fingerprint technology used to identify videos in the video database.

12. The data processing system of claim 10, the audio fingerprint is generated according to a fingerprint technology that is the same fingerprint technology used to identify songs and song metadata in a music database.

13. The data processing system of claim 10, wherein the one or more processor units execute the computer code stored in the one or more memory units to:
determine a stretch factor that indicates a playback speed mismatch between the audio sample and the reference video; and
transmit the stretch factor to the client device such that the client device can compute a synchronized playback time of the reference video.

* * * * *